United States Patent
Bronstein et al.

(10) Patent No.: US 10,877,980 B1
(45) Date of Patent: *Dec. 29, 2020

(54) SYSTEM AND METHOD FOR DETERMINING USER KNOWLEDGE SCORES BASED ON TOPIC ANALYSIS OF MAPPED CONTENT

(71) Applicant: Fuze, Inc., Boston, MA (US)

(72) Inventors: Stephen Bronstein, Boston, MA (US); Diana Ye, Boston, MA (US)

(73) Assignee: Fuze, Inc., Boston, MA (US)

( * ) Notice: Subject to any disclaimer, the term of this patent is extended or adjusted under 35 U.S.C. 154(b) by 195 days.

This patent is subject to a terminal disclaimer.

(21) Appl. No.: 16/214,576

(22) Filed: Dec. 10, 2018

Related U.S. Application Data

(63) Continuation of application No. 15/687,114, filed on Aug. 25, 2017, now Pat. No. 10,191,951.

(51) Int. Cl.
*G06F 16/2457* (2019.01)
*G06F 16/2458* (2019.01)
*G06F 16/248* (2019.01)

(52) U.S. Cl.
CPC ...... *G06F 16/24578* (2019.01); *G06F 16/248* (2019.01); *G06F 16/2462* (2019.01)

(58) Field of Classification Search
CPC ............ G06F 17/2785; G06F 17/2765; G06F 17/277; G06F 17/274; G06F 17/289; G06F 17/28; G06F 3/0481; G06F 17/3053; G06F 17/21; G06F 17/30867
See application file for complete search history.

(56) References Cited

U.S. PATENT DOCUMENTS

| | | |
|---|---|---|
| 2008/0313119 A1 | 12/2008 | Leskovec |
| 2010/0049770 A1* | 2/2010 | Ismalon ............... G06F 16/335 707/765 |
| 2015/0169746 A1* | 6/2015 | Hatami-Hanza ........ G06F 16/25 706/18 |
| 2016/0147891 A1 | 5/2016 | Chhichhia |
| 2016/0225372 A1* | 8/2016 | Cheung .................. G10L 15/22 |
| 2016/0328403 A1* | 11/2016 | Park ...................... G06F 16/951 |

OTHER PUBLICATIONS

Starmind—swiss made software, Webpage tilted Solution, 12 pages, Retrieved on Dec. 1, 2017 from URL: http://www.starmind.com/solution.

* cited by examiner

*Primary Examiner* — Angelica Ruiz
(74) *Attorney, Agent, or Firm* — McDermott Will & Emery LLP

(57) ABSTRACT

Various aspects of the subject technology related to systems and methods for mapping communication content based on topic analysis to determine user knowledge scores. A system may be configured to receive communication content including spoken and non-spoken content. The system may convert spoken content to non-spoken content and a data set of the communication content may be generated. The system may construct a generative statistical model identifying a list of topics in the data set. The generative statistical model may also identify the topic percentage of words in the data set that are associated with a given topic. The system may generate a communication content graph identifying user nodes and word edges. The system may calculate a topic strength for each word edge and determine a user knowledge score for each user associated with each identified topic. The system may output the user knowledge score.

20 Claims, 15 Drawing Sheets

Topic 1 Content Table

| Nodes | Topic Percentage<br>Topic 1 |
|---|---|
| AD | 0 |
| AC | 0 |
| BCE | 0.8 |
| DE | 0.55 |
| CD | 0.7 |

500

Topic 2 Content Table

| Nodes | Topic Percentage<br>Topic 2 |
|---|---|
| AD | 0.4 |
| AC | 0 |
| BCE | 0.2 |
| DE | 0 |
| CD | 0.2 |

Topic 3 Content Table

| Nodes | Topic Percentage<br>Topic 3 |
|---|---|
| AD | 0.6 |
| AC | 1 |
| BCE | 0 |
| DE | 0.45 |
| CD | 0.2 |

Topic 3 Communication Content Graph

| Nodes | Topic Percentage | | |
|---|---|---|---|
| | Topic 1 | Topic 2 | Topic 3 |
| AD | 0 | 0.4 | 0.6 |
| AC | 0 | 0 | 1 |
| BCE | 0.8 | 0.2 | 0 |
| DE | 0.55 | 0 | 0.45 |
| CD | 0.7 | 0.2 | 0.2 |

Figure 5D

| Nodes | Type | Length | Participants | Weight |
|---|---|---|---|---|
| AD | Email | 400 | 2 | 0.5 |
| AC | Phone | 650 | 2 | 1 |
| BCE | Video | 500 | 3 | 0.75 |
| DE | IM | 100 | 2 | 2 |
| CD | Phone | 500 | 2 | 1 |

Figure 5E

| Nodes | Topic Strength for each User | | |
|---|---|---|---|
| | Topic 1 | Topic 2 | Topic 3 |
| AD | 0 | 40 | 60 |
| AC | 0 | 0 | 325 |
| BCE | 100 | 25 | 0 |
| DE | 55 | 0 | 45 |
| CD | 175 | 50 | 50 |

Figure 5F

| Nodes | User Knowledge Scores | | |
|---|---|---|---|
| | Topic 1 | Topic 2 | Topic 3 |
| A | 0 | 40 | 385 |
| B | 100 | 25 | 0 |
| C | 275 | 75 | 375 |
| D | 230 | 90 | 155 |
| E | 155 | 25 | 45 |

Figure 5G

 I'm looking for an expert in...

| 🔍 Search by topic... | Go! |

Popular searches: Topic: 1, Topic: 2 ← 625

---

New to the company? Find an expert in benefits ← 630

Amy Fuller
Title - Location
[Start a conversation]
You last talked 2 *days* ago

Loren Kasper
Title - Location
[Start a conversation]
[Get an introduction]

Don Wright
Title - Location
[Start a conversation]
[Get an introduction]

---

Helping out a customer? Find an expert in customer service

Amy Fuller
Title - Location
[Start a conversation]
You last talked 2 *days* ago

Loren Kasper
Title - Location
[Start a conversation]
You last talked 1 *month* ago

Don Wright
Title - Location
[Start a conversation]
[Get an introduction]

---

Meet some coworkers in the marketing department ← 635                                  ← 640

Amy Fuller
VP of Marketing - Boston, MA
Topic: 1 - Topic: 2 - Topic: 3
[Start a conversation]
[Get an introduction]

Loren Kasper
VP of Marketing - Boston, MA
Topic: 1 - Topic: 2 - Topic: 3
[Start a conversation]
[Get an introduction]

645

Don Wright
VP of Marketing - Boston, MA
Topic: 1 - Topic: 2 - Topic: 3
[Start a conversation]
[Get an introduction]

SYSTEM AND METHOD FOR DETERMINING USER KNOWLEDGE SCORES BASED ON TOPIC ANALYSIS OF MAPPED CONTENT

CROSS-REFERENCE TO RELATED APPLICATIONS

The present application claims the benefit of priority under 35 U.S.C. § 120 as a continuation from U.S. patent application Ser. No. 15/687,114 entitled "SYSTEM AND METHOD FOR DETERMINING USER KNOWLEDGE SCORES BASED ON TOPIC ANALYSIS OF MAPPED CONTENT," filed on Aug. 25, 2017, the disclosure of which is hereby incorporated by reference in its entirety for all purposes.

TECHNICAL FIELD

The present disclosure generally relates to mapping communication content that is generated and shared among users, and performing an analysis of topics within the shared content using generative statistical models, and more specifically relates to determining user knowledge scores based on topic analysis of mapped content.

BACKGROUND

Content created by members of an organization can be shared with other members of the organization utilizing a variety of methods, not limited to but including electronic mail, instant messaging, text messaging, video teleconferences, audio data or phone calls, meeting invitations or calendar entries and other methods of communication. The subject matter of the content that is shared within these communication methods represents a collective knowledge base of information within the organization. The communication content is inherently made up of various topics that are pertinent to the communications occurring between members of the organization at any given time. Organizing the communication content to extract the topic data often requires instrumenting the communication methods with specialized interfaces or logging functionality to capture and mine the communication content such that a data model or architecture can be built for the purposes of performing topic analysis. Interfaces and data models of communication content that are shared within an organization are often not capable of producing useful information about the scope of topics being shared in the content or to determine which members of the organization are most knowledgeable on a given topic.

The description provided in the background section should not be assumed to be prior art merely because it is mentioned in or associated with the background section. The background section may include information that describes one or more aspects of the subject technology.

SUMMARY

The disclosed system provides for mapping communication content based on topic analysis to determine user knowledge scores. The system includes memory storing instructions and processors that are configured to execute the instructions. The instructions, when executed, cause the processors to receive communication content. The received communication content can include spoken content and non-spoken content. The processors are further configured to execute the instructions to convert the spoken content to additional non-spoken content. The processors are also configured to execute the instructions to generate a data set of the communication content including the words contained in the converted content and the received non-spoken content. The processors are configured to execute the instructions to construct a generative statistical model from the data set identifying a list of topics from the data set and a topic percentage determined from a probability that a word in the data set is associated with a given topic in the identified list of topics. The processors are also configured to execute the instructions to generate a communication content graph including user nodes and word edges for each identified topic in the list of topics. The user nodes represent users receiving or generating communication content and the word edges represent the words shared between two users. The processors are further configured to execute the instructions to calculate a topic strength for each word edge and determine a user knowledge score, based on the calculated topic strength, for each user associated with each identified topic. The processors are configured to execute the instructions to output the user knowledge score.

According to certain aspects of the present disclosure, a method for mapping communication content based on topic analysis to determine user knowledge scores is provided. The method includes receiving communication content including spoken content and non-spoken content. The method also includes converting the spoken content to additional non-spoken content and generating a data set of the communication content. The generated data set includes the words contained in the converted content and the received non-spoken content. The method also includes constructing a generative statistical model from the data set identifying a list of topics from the data set and a topic percentage determined from a probability that a word in the data set is associated with a given topic in the identified list of topics. The method further includes generating a communication content graph including user nodes and word edges for each identified topic in the list of topics. The user nodes represent users receiving or generating communication content and the word edges represent words shared between two users. The method includes calculating a topic strength for each word edge and determining a user knowledge score, based on the calculated topic strength, for each user associated with each identified topic. The method also includes outputting the user knowledge score for use or display in a topic search user interface or a topic browsing user interface.

According to certain aspects of the present disclosure, a machine readable storage medium containing program instructions for causing a computer to map communication content based on topic analysis to determine user knowledge scores is provided. The program instructions contained on the machine readable storage medium perform the method including receiving communication content including spoken content and non-spoken content generated by employees of an organization. The program instructions also perform the method including converting the spoken content to additional non-spoken content and generating a data set of the communication content. The generated data set includes the words contained in the converted content and the received non-spoken content. The program instructions further perform the method including constructing a generative statistical model from the data set using a Latent Dirichlet allocation method. The generated statistical model identifies a list of topics from the data set and a topic percentage determined from a probability that a word in the data set is associated with a given topic in the identified list of topics. The program instructions further perform the method including normalizing the communication content of the data set in the generative statistical model. The program instructions perform the method including generating a communication content graph including employee nodes and word edges for each identified topic in the list of topics. The employee nodes represent employee receiving or generating communication content and the word edges represent words shared between two employees. The program instructions further perform the method including calculating a topic strength for each word edge by multiplying the topic percentage by the number of words in the communication content and further multiplying the results by a communication content weight. The program instructions perform the method including determining an employee knowledge score for each employee associated with each identified topic, based on the calculated topic strength, by summing the employee's topic strength associated with each topic for all adjacent edges in the communication content graph. The program instructions also perform the method including outputting the employee knowledge score to a database.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIGS. 5A-5G are example illustrations associated with the example process of FIG. 4.

FIGS. 6A-6F illustrate example user interfaces utilizing user knowledge scores.

Figure 1:
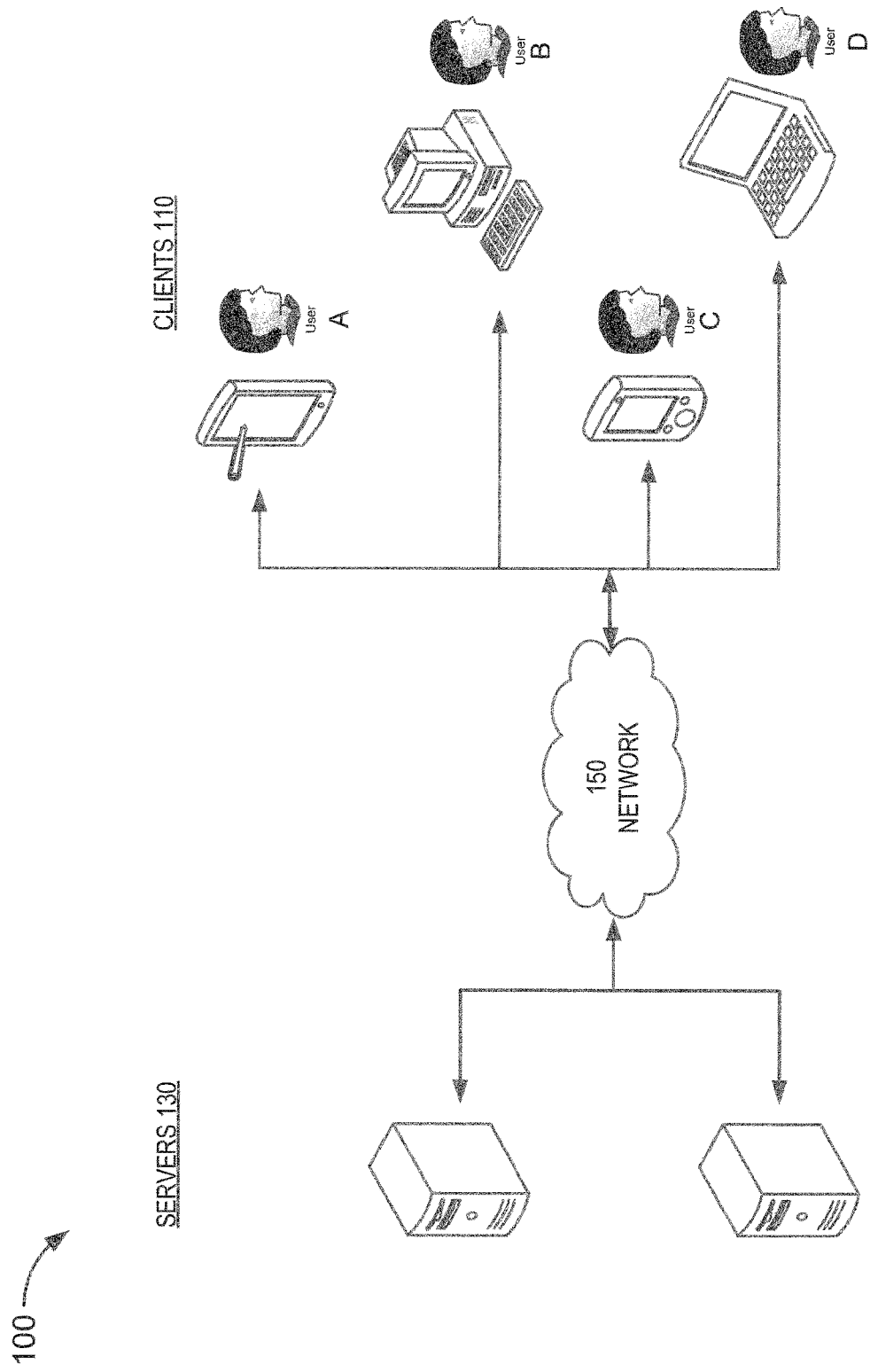
FIG. 1 illustrates an example architecture for mapping communication content based on topic analysis to determine user knowledge scores.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

General Overview

The disclosed system and method provides for determining user knowledge scores by mapping communication content based on topic analysis. Communication content that is generated and shared among members of an organization is received and stored on a server. The communication content may include emails, text messages, instant messages, meeting or calendar invites, video recordings, and phone calls or other audio recordings. The content includes spoken and non-spoken communication content. Within the communication content, words represent the subject matter being discussed by members of the organization. The words represent the basic communication elements that are shared about a given topic. By analyzing the prevalence or proportion of words in the communication content shared between members in an organization, a list of topics can be determined. In addition, the members of the organization most commonly associated with those topics and/or words can also be determined. By analyzing the communication content shared between members, an organization may gain insight into which members are most knowledgeable on a particular topic.

The disclosed system provides an improvement to computer functionality by allowing computer performance of a function not previously performed by a computer. Specifically, the disclosed system provides for mapping communication content based on topic analysis to determine user knowledge scores. In large organizations, it is often difficult to determine a knowledgeable resource for a given topic. Subject matter experts for a particular topic can be formally identified but may not be visible to other members of organization due to geographic location or lack of awareness within an organization. Roles and responsibilities change frequently and a resource that was knowledgeable about a particular topic in the past may not be as knowledgeable about the same topic presently or in the future.

In addition, the scope of subject matter being communicated within an organization is constantly changing and new topics are constantly being generated during discussions between members of the organization. Members of an organization may communicate at a particular time on a specific topic and at a later time, the topic is no longer discussed with the same frequency or volume of communication as it was in the past. Systems to manage communication content within an organization must poll and evaluate organizational content shared between members on a frequent basis in order to best represent the range of topics being discussed as well as the most knowledgeable resource associated with any given topic.

Knowledge management systems (KMS) are often used in organizations to improve performance toward organizational objects, share information, enhance innovation and/or competitive advantage as well as foster continuous improvement of the organization. KMS often are designed to support one or more specific strategies for managing content shared in an organization. For example, a KMS tool can be configured to implement a "push" strategy. In a "push" strategy individuals explicitly encode their knowledge into a shared repository, such as a database. A KMS tool can also be configured to implement a "pull" strategy. In a "pull" strategy individuals make requests for knowledge to experts associated with a particular subject. A variety of user interfaces accompany KMS tools that are configured to implement either strategy. The user interfaces may limit or restrict the KMS functionality based on the format of data being "pushed" into a shared repository or "pulled" from experts.

A more robust solution would enable a broad capture of communication content shared within an organization such that the captured content can be manipulated using statistical methods to generate a data model associated with the communication content topics as shared by the content contributors. For example, communication content shared within an organization (e.g., email, text messages, instant messages, documents, presentations, phone calls, video and audio recordings, and the like) can be received by a system and stored on a server. The system can convert the spoken content to additional non-spoken content and build a data set of all communication content. A generative statistical model can be created from the data set to identify a list of topics included in the communication content as well as a topic percentage based on the probability or likelihood that a word in the data set is associated with a given topic. A content graph can be constructed for each topic and the content graph can be used to identify members of the organization, or users receiving and/or generating communication content. For example, a content graph can be constructed for each topic and the content graph can include nodes representing users, or members of the organization, as well as edges representing the words that are shared between two users, or members of the organization. Once a content graph has been calculated for each topic, a calculation of topic strength can be calculated for each edge. Based on calculating the topic strength of a topic communicated between one or more members of the organization, a knowledge score for each member can be determined and output to a variety of user interfaces.

The disclosed system and method provides an improvement to computer functionality by allowing computer performance of a function not previously performed by a computer. Specifically, the disclosed system and method provide for analyzing communication content or data to determine the level of knowledge held by a user of a communication system or a member of an organization using the communication system in which the content or data is communicated among users. The disclosed system and method solve this problem by allowing computer performance of a function not previously performable by a computer such the computer may determine user knowledge scores from communication content shared between users by mapping communication content based on topic analysis as described according to the system and methods disclosed herein.

Many examples are provided herein in the context of a corporation, the principles of the present disclosure contemplate other types of organizations as well. For example, non-profit, institutional and governmental entities (e.g., administrative or military) are all considered within the scope of the present disclosure. An organization may also be a consortium of schools and/or campuses. In general terms, an organization is an operating unit and is, itself, made up of different operating units that may correspond to business units, departments, product teams, cross-functional teams, sub-departments, etc. The systems and methods described herein do not require any particular arrangement of entities or operating units but, instead, allow the organization to model its resources and processes into a hierarchy of operating units for purposes of management, planning, communication and reporting. The systems and methods described herein can also apply to any group of users, such as an ad-hoc group of individuals or users who are communicating amongst themselves and sharing knowledge between individuals.

Example System Architecture

FIG. 1 illustrates an example architecture 100 for mapping communication content based on topic analysis to determine user knowledge scores. The architecture 100 includes servers 130 and clients 110 connected over a network 150.

One of the many servers 130 is configured to host is the system for mapping communication content based on topic analysis to determine user knowledge scores. For purposes of load balancing, multiple servers 130 can host the system for mapping communication content based on topic analysis to determine user knowledge scores. As discussed herein, the system for mapping communication content based on topic analysis to determine user knowledge scores enables content generated and received among members of an organization to be mapped so that the content can be analyzed for prevalent topics being shared or discussed. The analyzed topics may be further correlated to the members of the organization who are most knowledgeable of a particular topic. The system and method of mapping communication content based on topic analysis to determine user knowledge scores can be implanted within the exemplary architecture 100 shown in FIG. 1. Members of an organization, such as Users A-D in FIG. 1, generate and receive communication content on various types of client devices 110. For example, Users A-D, may be members of the hardware customer service team at a technology company. User A may generate a text message to report a broken printer using his/her tablet client device 110. User B may receive the text message as a help ticket about the broken printer at their desktop computer client device 110. Users C and D may be using their wireless client devices 110 to coordinate a meeting with each other to discuss a new printer vendor for the organization. The communication content generated and received by each user of client devices 110 is transmitted via network 150. The network 150 connects client devices 110 to servers 130. The servers 130 operate to receive, store and process the communication content generated and received by client devices 110. The servers 130 may include memory and one or more processors configured to execute instructions that when executed the instructions cause the processors to map communication content shared between Users A-D based on topic analysis to determine user knowledge scores for each user.

The servers 130 can be any device having an appropriate processor, memory, and communications capability for hosting data encoder service. The clients 110 to which the servers 130 are connected over the network 150 can be, for example, desktop computers, mobile computers, tablet computers (e.g., including e-book readers), mobile devices (e.g., a smartphone or PDA), set top boxes (e.g., for a television), video game consoles, or any other devices having appropriate processor, memory, and communications capabilities. In certain aspects, one or more of the servers 130 can be a cloud computing server of an infrastructure-as-a-service (IaaS) and be able to support a platform-as-a-service (PaaS) and software-as-a-service (SaaS) services.

The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

Figure 2:
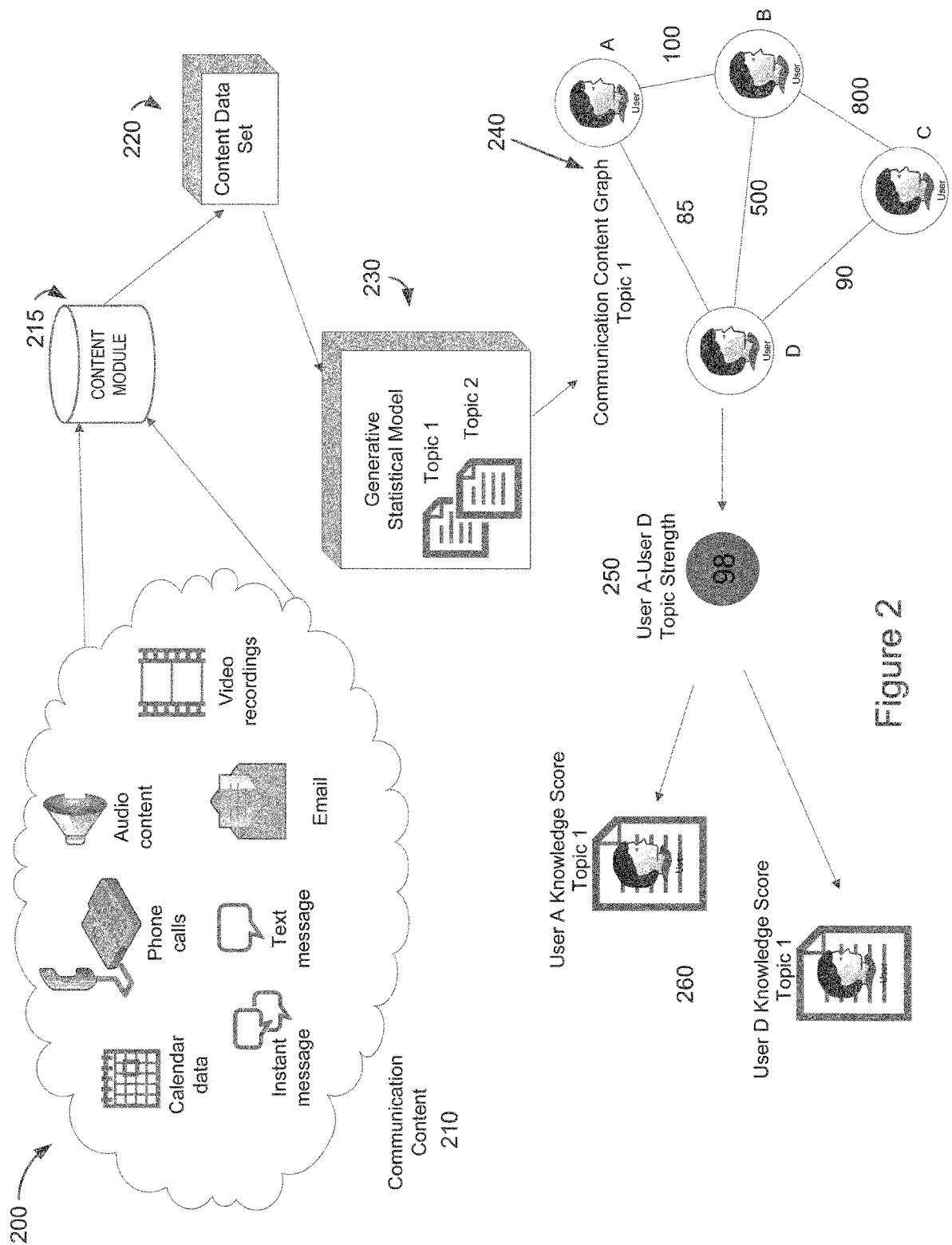
FIG. 2 is a diagram illustrating a system overview for mapping communication content based on topic analysis to determine user knowledge scores according to certain aspects of the disclosure.

FIG. 2 is a diagram illustrating a functional system overview 200 of mapping communication content based on topic analysis to determine user knowledge scores according to certain aspects of the disclosure.

As shown in FIG. 2, communication content 210 may originate in a variety of manners and may include spoken and non-spoken content. For example, users of an organization may generate or receive spoken communication content such as phone calls, call recordings, video meeting recordings and/or audio meeting recordings. Additionally, or alternatively, users of an organization may generate or receive non-spoken content such as email, text messages, instant messages, calendar data or meeting invites. Communication content 210 may include any form of content shared among members of an organization that can be organized into spoken content and non-spoken content. According to certain aspects of the disclosure, the system and method convert spoken content to additional non-spoken content in order to map the communication content and determine the topics being discussed in the communications occurring between users or members of an organization.

As further shown in FIG. 2, communication content 210 may be stored in Content Module 215 for further conversion and further processing. Content Module 215 may be a physical memory device or a database implemented in software for example, storing the various types of communication content generated and received between users. Further description of Content Module 215 will be provided in relation to FIG. 3.

As shown in FIG. 2, the received non-spoken content (e.g., emails, text messages and calendar invites) and the additional non-spoken content that was converted from spoken communication content are combined to generate a content data set 220 that includes a plurality of words contained within the received non-spoken content and the converted content.

As shown further in FIG. 2, the content data set 220 is used as input to a generative statistical model 230. According to some implementations of the present disclosure, a generative statistical model 230 is constructed from the content data set 220. The generative statistical model 230 identifies a list of topics from within the content data set 220 and identifies a topic percentage based on the probability or likelihood that a word in the content data set 220 is associated with a given topic in the identified list of topics. For example, assume the content data set 220 represents the collection of all words shared as communication content 210 between users of an organization. A generative statistical model 230 may be constructed to identify a list of topics, such as Topic 1 and Topic 2 shown as associated with the generative statistical model 230. The generative statistical model 230 would also identify the probability or likelihood that a word found in the content data set 220 is associated with Topic 1 versus Topic 2. For example, a word in the content data set may be equally probable to be associated with each of the two identified topics or a word may have a larger probability of being associated with Topic 1, while the same word may have a smaller probability of being associated with Topic 2. Additionally, or alternatively, the output of the generative statistical model may be reviewed and a list of topics may be manually identified. In some implementations, constructing the generative statistical model is performed using a Latent Dirichlet allocation method, an unsupervised topic modeling method or a generative probabilistic topic modeling method.

Based on constructing generative statistical model 230, a communication content graph 240 may be generated for each identified topic in the list of topics generated by the generative statistical model of the communication content 210. The communication content graph, such as communication content graph 240 corresponding to Topic 1, may include nodes representing users or members of the organization generating or receiving communication content associated with Topic 1. The edges or links connecting the nodes represent the words shared between two users. For example, the communication content graph 240 associated with Topic 1 illustrates Users A-D generating or receiving communication content associated with Topic 1. User A shared communication with User B and User D, but did not share communication with User C. User D shared communication with Users A, B, and C.

After generating a communication content graph corresponding to Topic 1, a calculation of Topic Strength may be computed. Topic strength represents a score indicative of the likelihood that the communication shared between two users is correctly associated with the particular topic. Topic strength may be calculated by multiplying the likelihood that the communication shared between two users is correctly associated with the particular topic by the number of words in the communication content shared between two users and further multiplying that result by a communication content weight. For example, the topic strength, of the words associated with Topic 1 that are shared between User A and User B, is calculated to be 100; while the topic strength, of the words associated with Topic 1 that are shared between User A and User D, is calculated to be 85. Similarly, the topic strength, of the words associated with Topic 1 that are shared between User B and User C, is calculated to be 800. In some implementations, the communication content weight is user-provided. In other implementations, the communication content weight is determined as a function of the age of the communication content. In some implementations, the communication content weight is determined as a function of the type of communication content. For example, based on the words shared between User A and User D associated with Topic 1, the Topic Strength 250 calculated for the word edge A-D is computed to be 98.

As further shown in FIG. 2, based on calculating the topic strength for each word edge in the communication content graph, a User Knowledge score can be determined for each user associated with each identified topic. A User Knowledge score is a value to rank or represent the magnitude of knowledge a particular user possesses in regard to each identified topic. For example, based on the Topic Strength 250 determined for the communication shared between User A and User D, a User Knowledge score may be determined for both users. Additionally, or alternatively, the User Knowledge score may be determined by summing the user's Topic Strength associated with each topic for all adjacent edges in the communication content graph. In some implementations, the User Knowledge score may be output. For example, in some implementations that User Knowledge score may be output for use in a topic search interface. In other implementations, the User Knowledge score may be output for use in a topic browsing user interface.

Figure 3:
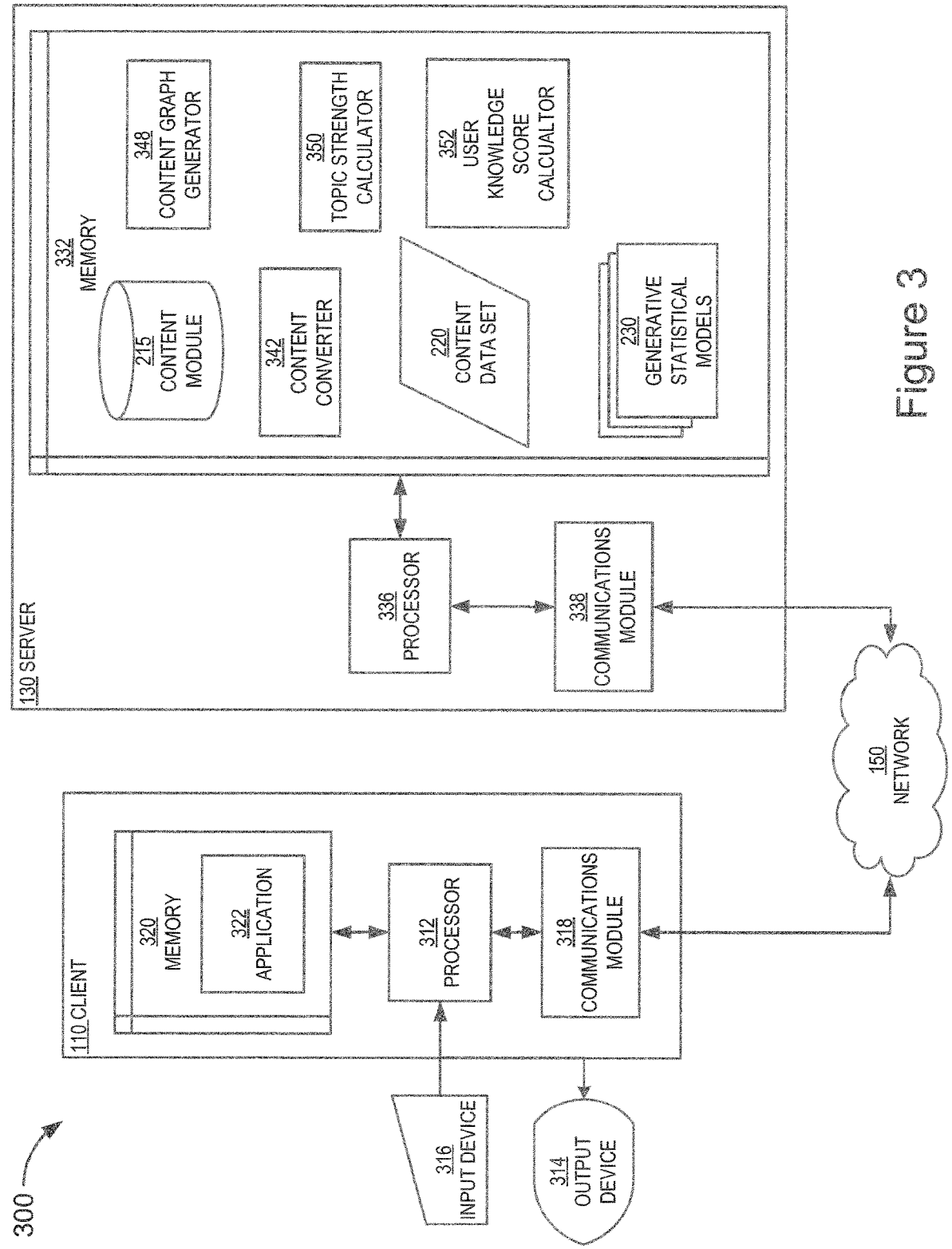
FIG. 3 is a block diagram illustrating the example client and server from the architecture of FIG. 1 according to certain aspects of the disclosure.

FIG. 3 is a block diagram of architecture 300 illustrating an example server 130 and client 110 similar to architecture 100 of FIG. 1 according to certain aspects of the disclosure.

The client 110 and the server 130 are connected over the network 150 via respective communications modules 318 and 338. The communications modules 318 and 338 are configured to interface with the network 150 to send and receive information, such as data, requests, responses, and commands to other devices on the network. The communications modules 318, and 338 can be, for example, modems or Ethernet cards.

The server 130 includes a processor 336, a communications module 338, and a memory 332 that includes one or more machine readable storage mediums containing program instructions for causing a computer to map communication content based on topic analysis to determine user knowledge scores. The processor 336 of the server 130 is configured to execute instructions, such as instructions physically coded into the processor 336, instructions received from software in memory 332, or a combination of both. For example, the processor 336 of the server 130 executes instructions to map communication content based on topic analysis to determine user knowledge scores that may be output to application 322 for display on client 110 or further output to output device 314. The server 130 also includes a memory 332 configured with one or more data content or data processing modules to receive and process communication content. The memory 332 includes a content module 215 capable of receiving spoken and non-spoken content transmitted from client devices 110. Memory 332 also includes a content converter 342 configured to convert spoken content to non-spoken content. Memory 332 includes a content data set 230 representing a data set generated from the converted communication content and including all of the words contained in the converted content and the received non-spoken content. Memory 332 also includes one or more generative statistical models 230 that are constructed to identify a list of topics from the data set and identify topic percentages based on the probability or likelihood that the words in the data set are associated with a given topic in the identified list of topics. Memory 332 includes a content graph generator 348 to generate a communication content graph including user nodes and word edges for each identified topic in the list of topics. Memory 332 also includes topic strength calculator 350 to calculate a topic strength for each word edge in the communication content graph. Memory 332 includes a user knowledge score calculator to determine user knowledge scores for each user associated with each identified topic. Memory 332 can output user knowledge scores to processor 336 and communication modules 338 to provide the user knowledge score data to client 110 and/or output device 314.

The client 110 includes a processor 312, the communications module 318, and the memory 320. The memory 320 includes application 320. For example, application 320 may include a web browser, an email application, an instant messaging application, a word processing application, or a video teleconferencing application. Application 322 may include, but is not limited to, any application used in an organization to generate spoken or non-spoken communication content. The client 110 also includes an input device 316, such as a keyboard or mouse, and an output device 314, such as a display. The processor 312 of the client 110 is configured to execute instructions, such as instructions physically coded into the processor 312, instructions received from software in memory 320, or a combination of both. For example, the processor 312 of the client 110 executes instructions to transmit communication content generated or received at the client device to server 130 for storage and processing to map communication content based on topic analysis to determine user knowledge scores.

The techniques described herein may be implemented as method(s) that are performed by physical computing device (s); as one or more non-transitory computer-readable storage media storing instructions which, when executed by computing device(s), cause performance of the method(s); or, as physical computing device(s) that are specially configured with a combination of hardware and software that causes performance of the method(s).

Figure 4:
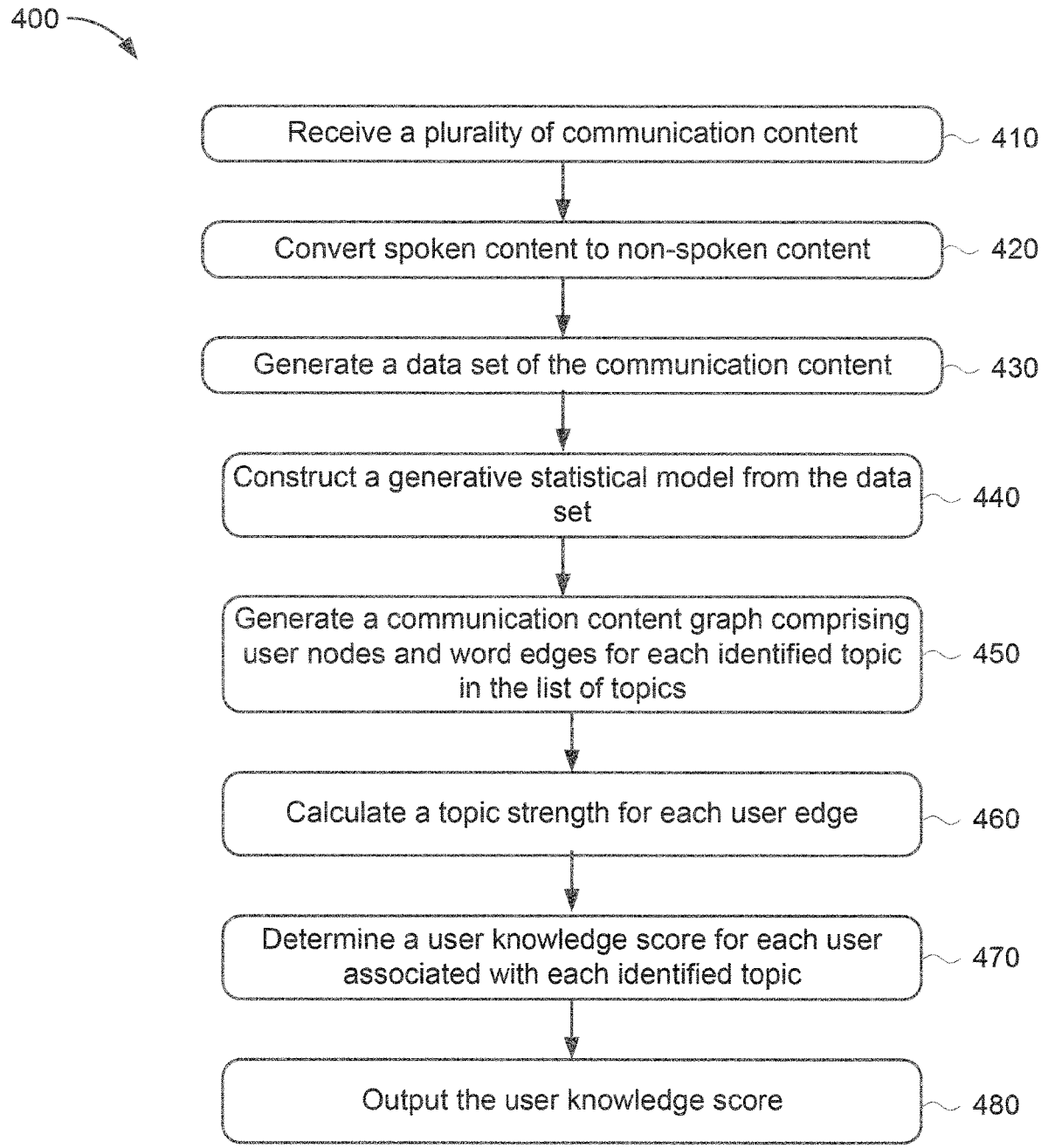
FIG. 4 illustrates an example process for mapping communication content based on topic analysis to determine user knowledge scores using the example client/server of FIG. 3.

FIG. 4 illustrates an example process 400 for mapping communication content based on topic analysis to determine user knowledge scores using the example client 110 and server 130 of FIG. 3. While FIG. 4 is described with reference to FIG. 3, it should be noted that the process steps of FIG. 4 may be performed by other systems.

The process 400 begins by proceeding from step 410 where server 130 receives a plurality of communication content. The plurality of received communication content can be generated by application 322 of client 110 or otherwise provided via network 150. The plurality of communication content can include but is not limited to call recordings, instant messages, text messages, audio meeting recordings, emails, calendar appointments and video meeting recordings. The plurality of communication content includes spoken and non-spoken content that is generated and received by members of an organization in the discussion of various topics throughout the organization. The plurality of received content is stored in content module 215 in preparation for conversion by content converter 342.

Next, in step 420, the spoken content that is received in the plurality of received communication content is converted to additional non-spoken content by content converter 342. For example, application 322 may include a multi-media collaboration environment capable of generating email, text messages and recording video teleconference data. The multi-media collaboration environment generates non-spoken data (e.g., email and text messages) as well as spoken data (e.g., the audio data that is associated with the video teleconference recording) that is processed by server 130. In this step, content converter 342 of server 130 converts the spoken audio data associated with the video teleconference recording to additional non-spoken content. In this way, the additional non-spoken communication content (e.g., the converted audio data) can be further processed, similarly to received non-spoken communication content, by content converter 342 in order to map the communication content based on topic analysis.

In step 430, a data set of the communication content is generated. The plurality of words contained in the received non-spoken content and the additional, converted non-spoken content are included in the content data set 220.

As further shown in FIG. 4, in the step 440, a generative statistical model is constructed from the data set. Based on the content data set 220, one or more generative statistical models 230 may be constructed. The generative statistical models 230 identify a list of topics from the data set and also identify a topic percentage based on the probability or likelihood that a word in the data set is associated with a given topic in the identified list of topics. In some implementations, constructing the generative statistical model is performed using Latent Dirichlet allocation method, unsupervised topic modeling method, or a generative probabilistic topic modeling method. Additionally, or alternatively, the output of the generative statistical model can be reviewed and the list of topics may be identified manually by a user.

In step 450, a communication content graph is generated including user nodes and word edges for each identified topic in the list of topics. A communication content graph is generated by content graph generator 348 and identifies users as nodes in the graph. The communication content graph generated by content graph generator 348 also includes edges or links connecting the user nodes which represent the words shared between two users for the identified topic that the communication content graph represents.

In step 460, topic strength is calculated for each word edge. A calculation of topic strength is made by topic strength calculator 350. Topic strength is calculated by multiplying the topic percentage, identified in the generative statistical model, by the number of words in the communication content as determined from the communication content graph. The result is further multiplied by a communication content weight. In some implementations, the communication content weight is provided by a user. In other implementations, the communication content weight may be determined as a function of the age of the communication content and/or the type of communication content. For example, a communication content weight may be defined to prioritize certain types of content higher than others. In this example, words associated with a given topic that originated from email may be assigned a communication content weight that is higher than words associated with a given topic that originated from phone calls or meeting invites. Additionally, or alternatively, older communication content may be assigned a lower communication content weight than newer communication content in order to prioritize older conversations lower than more recent or newer conversations.

Next, in step 470, a user knowledge score is determined for each user associated with each identified topic. A user knowledge score is determined by user knowledge score calculator 352 based on the calculated topic strengths. The user knowledge score is calculated by summing the user's topic strength associated with each topic for all adjacent edges in the communication content graph. The process ends in step 480, where the user knowledge score is output. User knowledge scores may represent an indication of how knowledgeable a particular user is in regard to a particular topic. User knowledge scores may be an important characteristic attributed to individual members of an organization to indicate the degree of knowledge a member of the organization possesses about a particular topic. In some implementations, the user knowledge score may be output for use in a topic search user interface. In other implementations, the user knowledge score may be output for use in a topic browsing user interface.

Figure 5A:
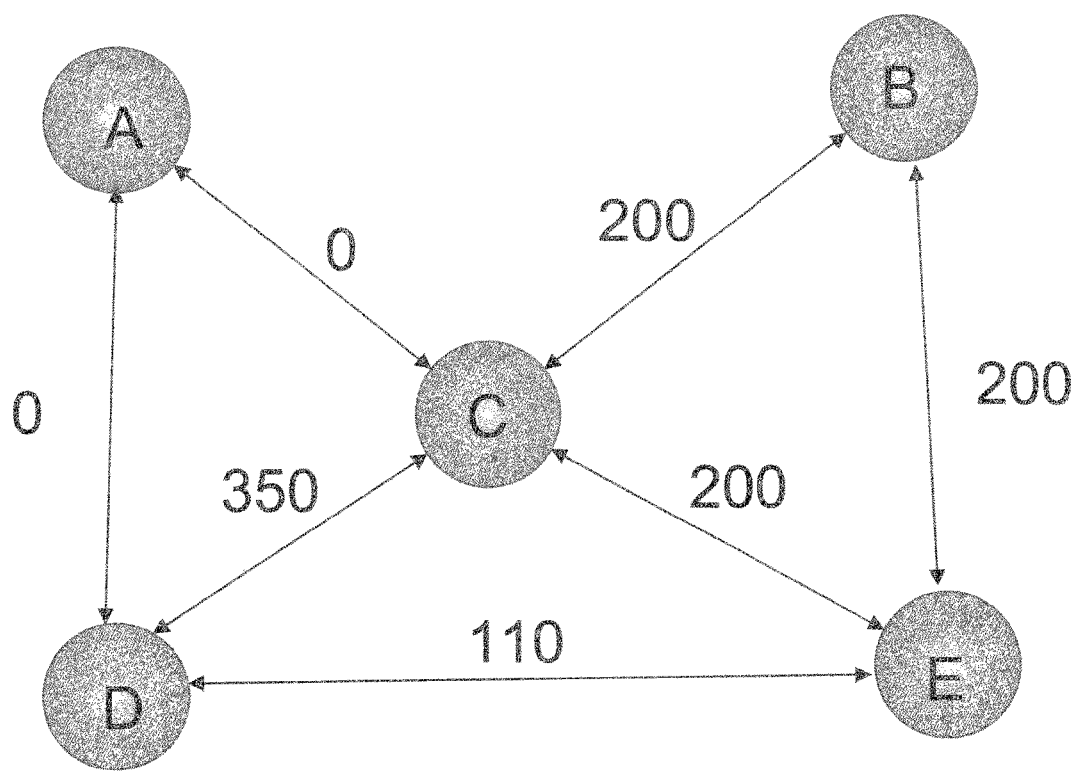

FIGS. 5A-5G set forth an example process 500 for mapping communication content based on topic analysis to determine user knowledge scores using the example client 110 and server 130 of FIG. 3. An example will now be described using the example process 400 of FIG. 4, to illustrate the steps for determining user knowledge scores based on a plurality of communication content. The process 500 begins by proceeding to step 440 where a generative statistical model has been constructed from a data set of communication content to identify a list of topics and a topic percentage based on the probability or likelihood that a word in the content data set is associated with a given topic in the identified list of topics To clarify the description of the foregoing figures, assume that generative statistical model has identified three topics discussed among five individual users in the data set of communication content. The Topic 1 Content Table shown in FIG. 5A illustrates the topic percentages that are based on the probability or likelihood that a word in the data set is associated with Topic 1. The topic percentage for a given communication is calculated by summing the probabilities or likelihood (e.g., the probability that is output from the generative statistical model) that each word in the communication is associated with one of the identified topics. The results for each topic are divided by the total across all topics to produce a topic percentage for each topic. For example, the generative statistical model has identified that the probability or likelihood of the communication between User A and User D being associated with Topic 1 is zero. Similarly, the generative statistical model has identified that there is an 80% probability or likelihood (shown as 0.8 in the table) that the words shared in the communication between Users B, C, and E are associated with Topic 1.

As further shown in FIG. 5A, the process continues at step 450 where a communication content graph is generated comprising user nodes and word edges for each identified topic. As shown in FIG. 5A, the generated Topic 1 Communication Content Graph identifies five user nodes (e.g., Users A-E) who have shared a words associated with Topic 1 between them. The numbers on the graph represent a topic strength calculation for each word edge linking two user nodes. For example, the generated Topic 1 Communication Content Graph shows that the topic strength for the word edge between User A and User D is zero (0). By contrast, the topic strength for the word edge connecting User B and User C is 200. Similarly, the topic strength for the word edge connecting User C and User D is 350.

Figure 5B:
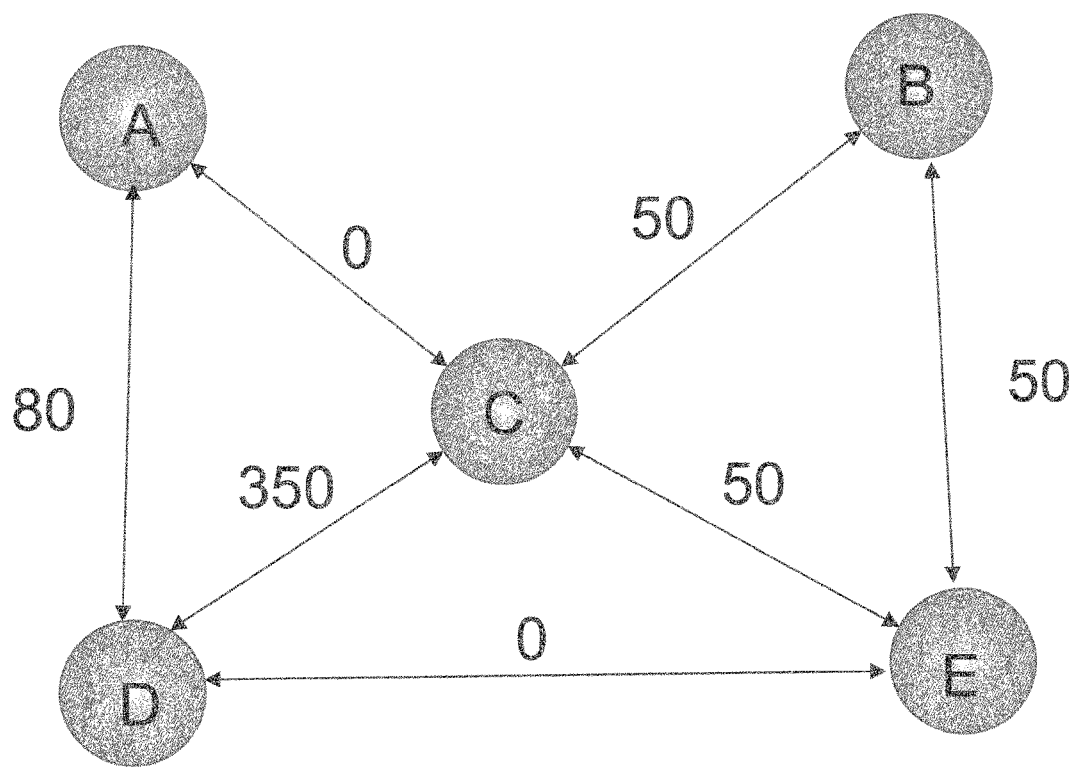

As shown in FIG. 5B, the process 500 continues by proceeding from step 440 where a generative statistical model has been constructed for Topic 2. The Topic 2 Content Table shown in FIG. 5B illustrates the topic percentages that are based on the probability or likelihood that a word in the data set is associated with Topic 2. For example, the generative statistical model has identified a 40% probability or likelihood (shown as 0.4 in the Topic 2 Content Table) that the words shared in the communication between User A and User D are associated with Topic 2. The topic percentage is calculated by multiplying all of the words in the communication content by their topic percentage and summing the results before normalizing to be represented as a fraction against all of the other topics. Similarly, the generative statistical model has identified there is a zero percent probability or likelihood that the words shared in the communication between User A and User C are associated with Topic 2. Still referring to FIG. 5B, the Topic 2 Content Table shows that the generative statistical model has identified that there is a 20% probability or likelihood (shown as 0.2 Topic 2 Content Table) that the words shared in the communication between Users B, C, and E are associated with Topic 2.

As further shown in FIG. 5B, the process continues at step 450 where a communication content graph is generated comprising user nodes and word edges for each identified topic. As shown in FIG. 5B, the generated Topic 2 Communication Content Graph identifies that the five user nodes (e.g., Users A-E) have shared a number of words associated with Topic 2 between them. The numbers on the graph represent a topic strength calculation for communication (shown as word edges) between two users (e.g., nodes). For example, the generated Topic 2 Communication Content Graph shows that the topic strength for the word edge between User A and User D is 80. By contrast, the topic strength for the word edge connecting User B and User C is 50. Similarly, the topic strength for the word edge connecting User C and User D is 350.

Figure 5C:
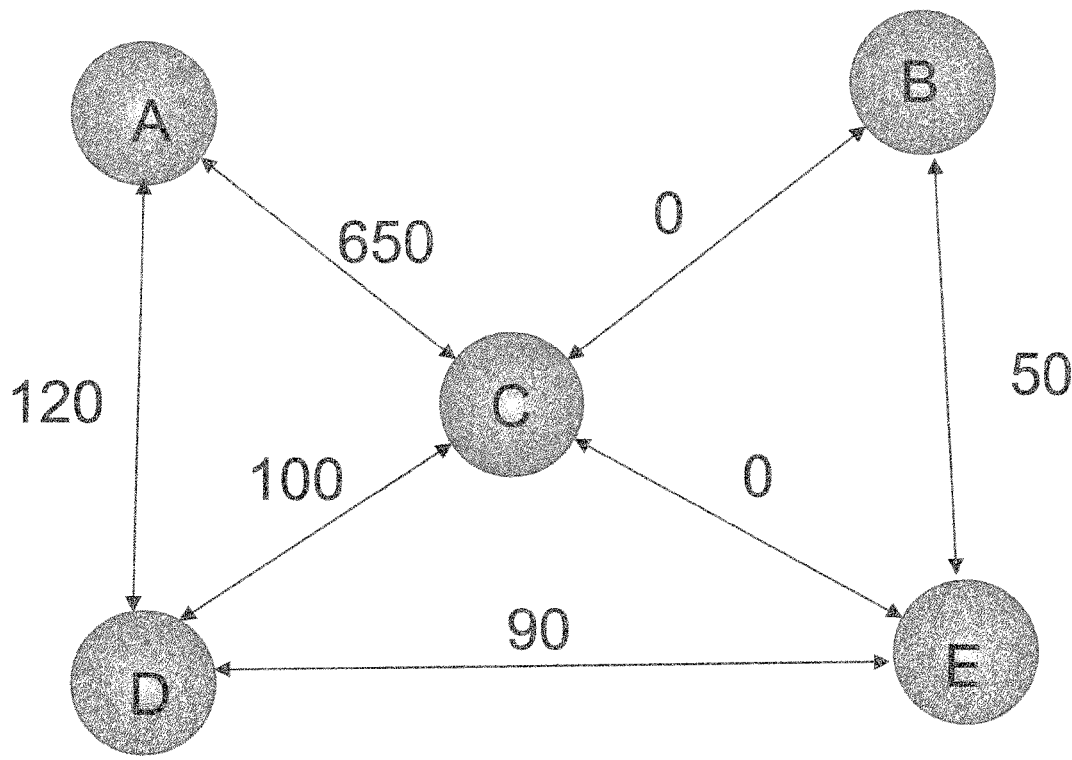

As shown in FIG. 5C, the process 500 continues by proceeding from step 440 where a generative statistical model has been constructed for Topic 3. The Topic 3 Content Table shown in FIG. 5C illustrates the topic percentages that are based on the probability or likelihood that a word in the data set is associated with Topic 3. For example, the generative statistical model has identified a 60% probability or likelihood (shown as 0.6 in the Topic 3 Content Table) that the words shared in the communication between User A and User D are associated with Topic 3. Similarly, the generative statistical model has identified a 100% probability or likelihood that the words shared in the communication between User A and User C are related to Topic 3. Still referring to FIG. 5C, the Topic 3 Content Table shows that the generative statistical model has identified that there is a zero percent probability or likelihood (shown as 0 in the Topic 3 Content Table) that the words shared between Users B, C, and E that are associated with Topic 3.

As further shown in FIG. 5C, the process continues at step 450 where a communication content graph is generated comprising user nodes and word edges for each identified topic. As shown in FIG. 5C, the generated Topic 3 Communication Content Graph identifies that the five user nodes (e.g., Users A-E) have shared a number of words associated with Topic 3 between them. The numbers on the graph represent a topic strength calculation for each word edge linking two user nodes. For example, the generated Topic 3 Communication Content Graph shows that the topic strength for the word edge between User A and User D is 120. By contrast, the topic strength for the word edge connecting User B and User C is 0 (zero). Similarly, the topic strength for the word edge connecting User C and User D is 100.

FIG. 5D illustrates the topic percentages for all topics discussed among the five users (e.g., Users A-E) as identified by the generative statistical model constructed from the data set.

FIG. 5E illustrates the type of communication (e.g., email, phone, video, and Instant Message (IM) identified in the "Type" column) that has occurred between specific users A-E. FIG. 5E also illustrates the total number of words (e.g., identified in the "Length" column) that have been shared between users for all topics identified by the generative statistical model. FIG. 5E further illustrates the number of participants (e.g., identified in the "Participants" column) that shared the total number of words associated with all topics identified by the generative statistical model and the communication content weight (e.g., identified in the "Weight" column) that has been assigned for each communication type. The communication content weight can be provided by a user and/or determined as a function of age of the communication content or determined as a function of the communication content type. For example, the instant messages (IM) shared between User D and User E in regard to Topics 1, 2, and 3 have a communication content weight of 2, whereas the email shared between User A and User D in regard to Topics 1, 2, and 3 have a communication content weight associated of 0.5. In this way the priority of communication content type can be accounted for when the topic strength for each word edge is calculated. The data presented in FIG. 5E is provided to further explain the additional steps of process 400.

As further shown in FIG. 5F, the process continues at step 460 where a topic strength for each word edge is calculated. Topic strength is calculated by multiplying the topic percentage by the number of words in the communication content and further multiplying this result by the communication content weight. The topic strength (TS) calculation can be represented by the following equation:

$$TS = ((\text{Topic Percentage} \times \text{number of words in the communication content}) \times \text{Communication Content Weight})$$

Dividing the result of this calculation by the number of participants (as shown in FIG. 5E) will produce a topic strength calculation for the communication between users. For example, using the data previously provided in FIGS. 5D and 5E, the topic strength calculations for User A and User D in regard to Topic 2 would be:

$$TS = ((0.4 \times 400) \times 0.5)/2 = 40.$$

Similarly the topic strength calculation for Users B, C, and E in regard to Topic 1 would be:

$$TS = ((0.8 \times 500) \times 0.75)/3 = 100$$

As further shown in FIG. 5G, the process continues at step 470 where a user knowledge score is determined for each user associated with each identified topics. The user knowledge score is determined by summing the topic strength associated with each topic for all of the user's adjacent edges in the communication content graph, e.g., all communications in which the user participated. For example, referring to FIG. 5F, User A shared communication on the three topics with User D and User C. The respective topic strengths for the word edges between User A and User D for the three identified topics were 0, 40, and 60 respectively. Similarly, the respective topic strengths for the word edges between User A and User C for the three identified topics were 0, 0, and 325 respectively. As shown in FIG. 5G, the result of summing User A's topic strength for all adjacent edges associated with Topic 1 will result in a User Knowledge score of 0. By summing the User A's topic strength for Topic 1 for the edge between User A and User D (e.g., 0 from FIG. 5F) and User A's topic strength for Topic 1 for the edge between User A and User C (e.g., 0 from FIG. 5F), it can be determined that User A's knowledge score for Topic 1 is 0.

Similarly, the result of summing User B's topic strength for all adjacent edges associated with Topic 1 will result in a User Knowledge score of 100 as shown in FIG. 5G. Since User B only participated in conversation with User C and User E about Topic 1, this is the only communication utilized in the determination of User B's knowledge score. By summing the User B's topic strength for Topic 1 for the edge between User C and User E (e.g., 100 from FIG. 5F) and User B's topic strength for Topic 1 for the edge between User A and User C (e.g., 0 from FIG. 5F), it can be determined that User A's knowledge score for Topic 1 is 0.

By way of further example, the result of summing User C's topic strength for all edges associated with Topic 1 will result in a User Knowledge score of 275 as shown in FIG. 5G. User C participated in discussion about Topic 1 with User A, User B, User D, and User E. By summing the User C's topic strength for Topic 1 for the edges between User C and User A (e.g., 0 from FIG. 5F) and User C's topic strength for Topic 1 for the edge between User B and User E (e.g., 100 from FIG. 5F), and User C's topic strength for Topic 1 for the edge between User C and User D (e.g., 175 from FIG. 5F), it can be determined that User C's knowledge score for Topic 1 is 275 (e.g., 0+100+175=275).

User knowledge scores can be determined for each user associated with each topic as described above and presented in FIG. 5G. After determining each user's knowledge score, the process continues at step 480 where the user knowledge scores are output. In some implementations, the user knowledge scores are output to memory. In other implementations, the user knowledge scores are output for use in a topic browsing user interface. In some implementations, the user knowledge scores are output for use in a topic search user interface.

FIGS. 6A-6F illustrate example user interfaces utilizing user knowledge scores according to the system and methods described herein. The user interfaces shown in FIGS. 6A-6E allow a user or member of an organization to search for topics and receive results identifying users or members of the organization with the highest user knowledge scores associated with the searched topic. The user interface shown in FIG. 6F displays associations between users who have been identified as having a high user knowledge score for a particular search topic and allows a user to ask for an introduction to the user with the highest user knowledge score for the searched topic.

Figure 6A:
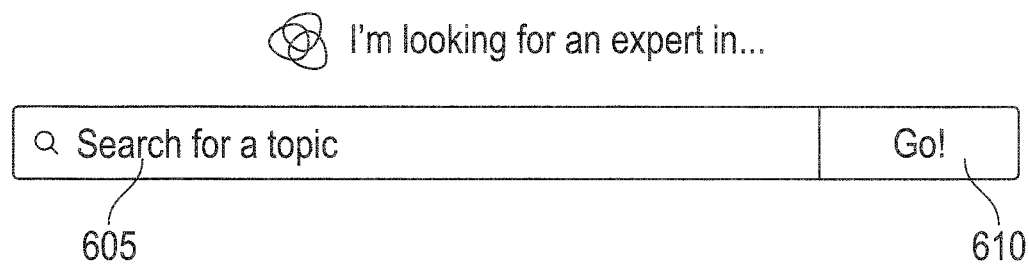

As shown in FIG. 6A, a topic search user interface may enable a user or member of an organization to input topic search terms. For example, a member of an organization enters specific topic search terms or keywords in input field 605. To perform the topic search based on the inputted topic search terms, the user selects the Go! Icon 610.

Figure 6B:
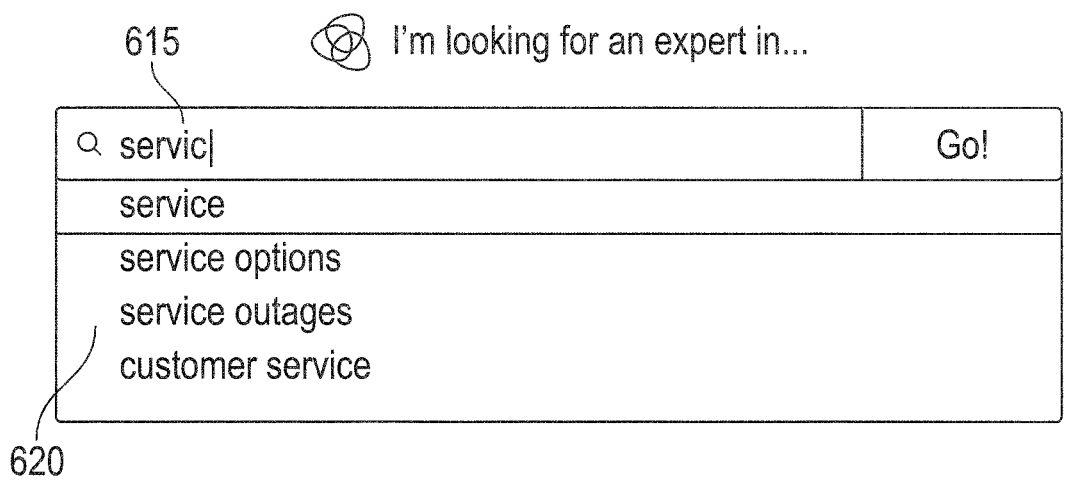

FIG. 6B illustrates an exemplary topic search user interface incorporating auto-completion of topic search terms. For example, a user may initiate a topic search for topics including the word "service". The topic search user interface may process the input topic search term as each letter is entered and automatically complete the input topic search term based on the input and the topics that are found within the organization being searched. As shown in FIG. 6B, the user has entered a partial topic search term "servic" (615) and the topic search user interface automatically completes the partial topic search term to provide a selection of candidate topic search terms 620 including the term "service". The user may select a topic search term from the list and select the "Go!" icon to perform the search based on the selected topic search term.

FIG. 6C illustrates an exemplary topic browsing user interface. The topic browsing interface identifies users with the highest user knowledge scores associated with the searched topic. The topic browsing interface provides additional content and suggestions to the user performing the topic search. For example, the topic browsing interface shown in FIG. 6C includes one or more popular search topics (625). In some implementations, the popular search topics 625 may identify the topics that are most frequently searched over a particular period of time, e.g., within the last week, month, or year. Additionally, or alternatively, the topic browsing interface may provide the user with topic search suggestions 630. For example, the topic browsing interface may present the user with suggested topic search terms (e.g., "Benefits") and identify users in the organization who have the highest user knowledge scores associated with the topic search term. In some implementations, the topic browsing interface may utilize data affiliating the user to a particular organizational position, or department. For example, the topic browsing interface may be configured to identify the user interacting with the topic browsing interface as a member of the marketing department and identify coworkers or suggest users in the organization who have the highest user knowledge scores associated with the marketing department, as shown in 635. In some implementations, users with the highest user knowledge score for a topic are individually identified, as shown in 640. The identified user data may include the user's name, position in the organization and location. In addition, the identified user data may include topics for which the identified user holds the highest user knowledge score, as shown in 645. For example, the identified user data 640 for "Amy Fuller" includes "Topic 1, Topic 2, Topic 3", as shown in 645. The topics 645 are topics for which "Amy Fuller" has been determined to possess the highest user knowledge score.

Figure 6D:
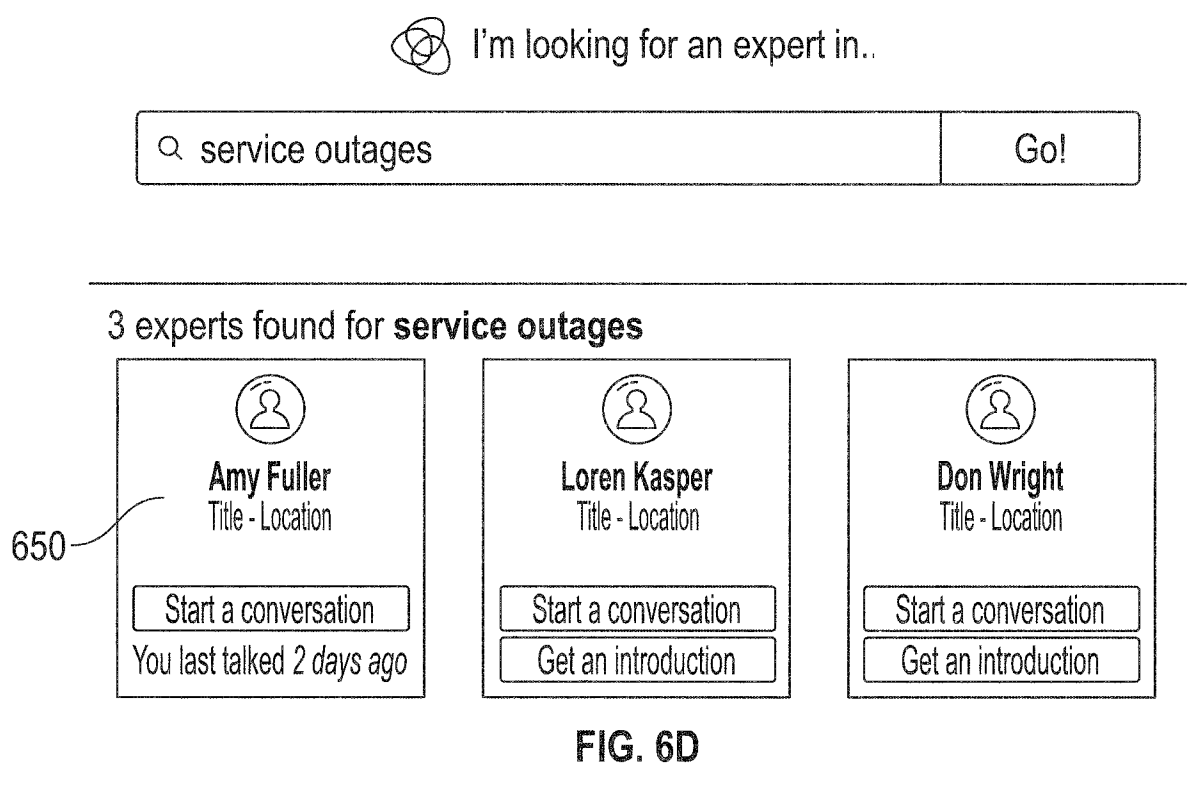

FIG. 6D illustrates an exemplary topic search user interface displaying topic search results. The topic search user interface may be configured to provide topic search results (e.g., users with the highest user knowledge score for the searched topic) in a tiled format. For example, a user who has entered a topic search for "service outages" receives the topic search results in a tiled format, as shown in 645. The topic search results identify those users in the organization with the highest user knowledge score for the topic "service outages".

Figure 6E:
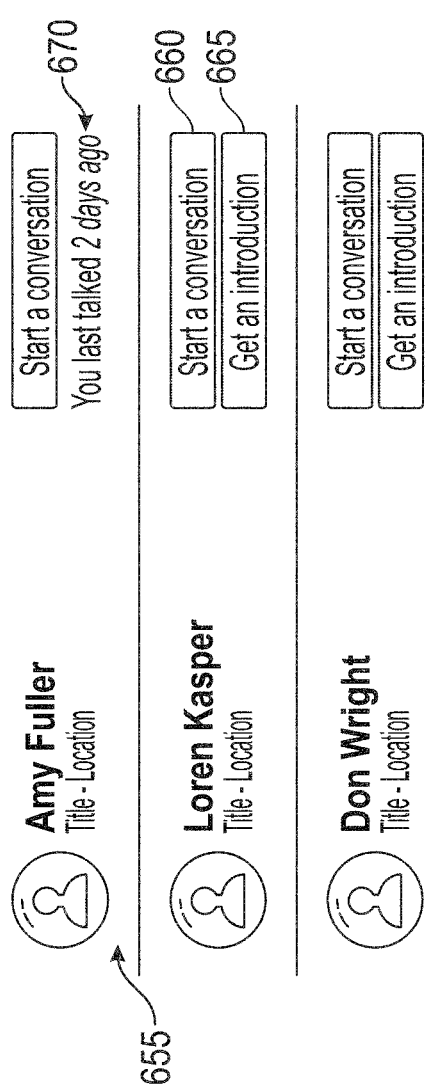

FIG. 6E also illustrates an exemplary topic search interface displaying topic search results. The topic search user interface may be configured to provide topic search results in a list format. For example, a user who has entered a topic search for "service outages" is presented with the search results in a list format, as shown in 655. The search results identify those users in the organization with the highest user knowledge score for the topic "service outages". In some implementations, the topic search user interface and/or the topic browsing user interface include graphical affordances or icons enabling the user performing the search to initiate contact with the user who has been identified as having a high user knowledge score associated with the searched topic. For example, upon searching for "service outages", a user is presented with topic search results identifying "Loren Kasper" as having expertise in "service outages". The user may initiate a conversation with "Loren Kasper" by selecting the "Start a conversation" icon, as shown in 660. The user interfaces described herein may be configured to interoperate with a variety of communication methods, such as instant messaging, email, phone, meeting scheduling or video conferencing. Additionally, or alternatively, the user may request an introduction to "Loren Kasper". For example, the user can select "Get an introduction", as shown in 665, to facilitate an introduction between "Loren Kasper" and the user performing the search. In some implementations, the topic search user interface and the topic browsing user interface may be configured to display data indicating the last time the user communicated with the user identified as having a high user knowledge score associated with the searched topic, as shown in 670. For example, the user last communicated with "Amy Fuller" two days ago.

Figure 6F:
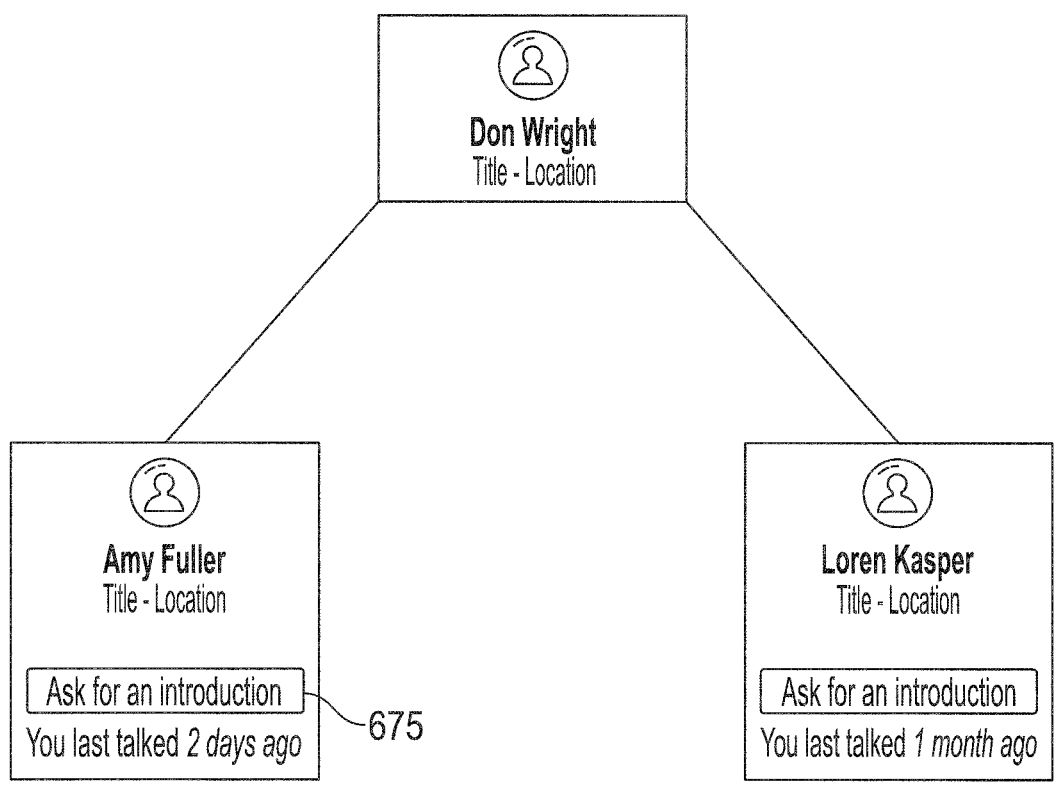

FIG. 6F illustrates an exemplary user interface displaying associations between users who have been determined to have a high user knowledge score for a particular search topic. Upon entering topic search terms and receiving results identifying other users in the organization who have a high user knowledge score associated with the searched topic, the user performing the search may request an introduction to the users with the highest knowledge scores for the searched topic. The user interface may present the associations and identify the best path to get an introduction based on who the user communicates with normally. For example, continuing the example in FIG. 6E, the topic search results indicate that "Don Wright" has a high user knowledge score for "service outages". A user may request to "Get an introduction" to "Don Wright". As shown in FIG. 6F, the user interface identifies that "Amy Fuller" and "Loren Kasper" are able to provide an introduction to "Don Wright". The user may ask "Amy Fuller" for an introduction to "Don Wright", as shown in 675.

Figure 7:
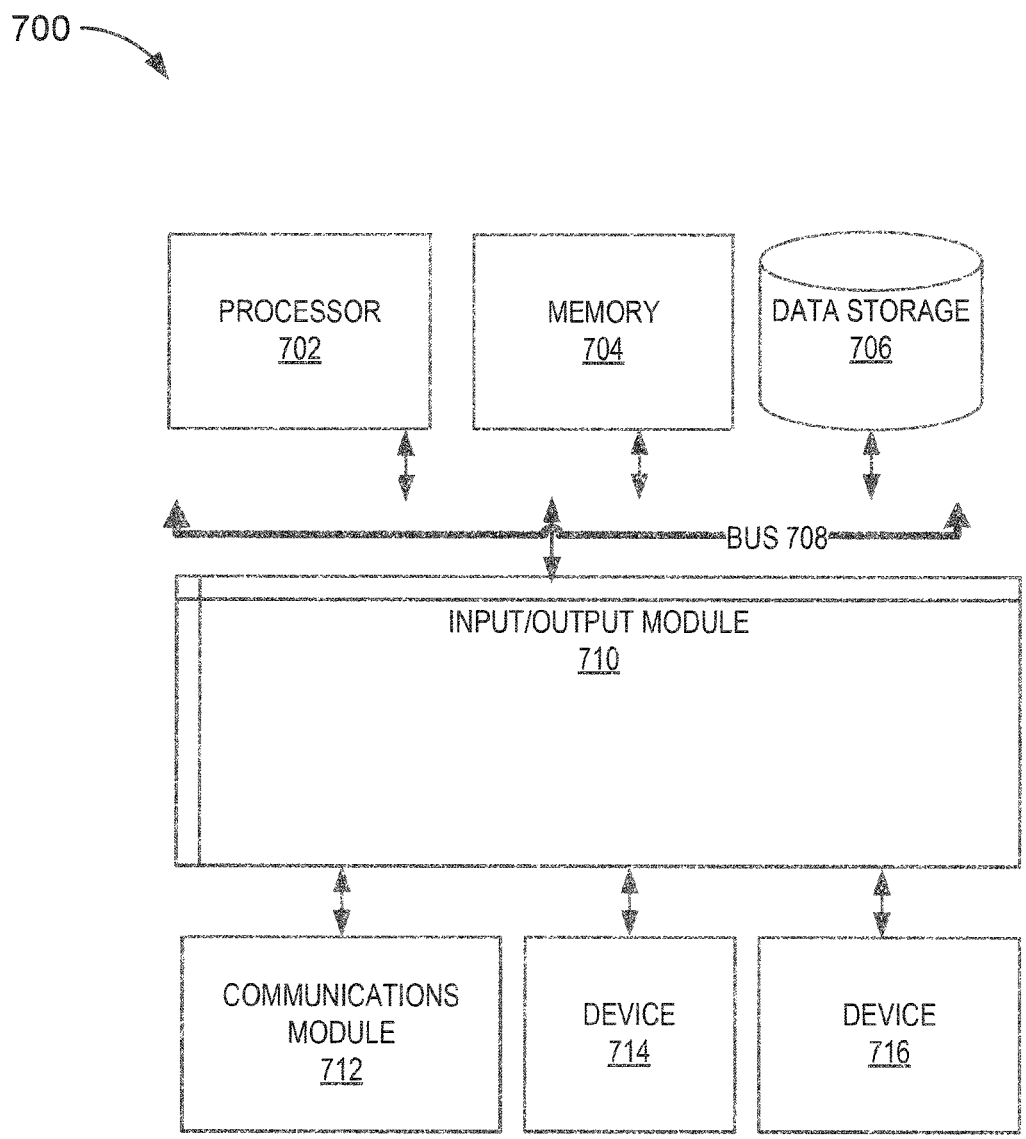
FIG. 7 is a block diagram illustrating an example computer system with which the clients and server of FIG. 3 can be implemented.

FIG. 7 is a block diagram illustrating an example computer system 700 with which the client 110 and server 130 of FIGS. 1 and 3 can be implemented. In certain aspects, the computer system 700 may be implemented using hardware or a combination of software and hardware, either in a dedicated server, or integrated into another entity, or distributed across multiple entities.

Computer system 700 (e.g., client 110 and server 130) includes a bus 708 or other communication mechanism for communicating information, and a processor 702 (e.g., processor 312 and 336) coupled with bus 708 for processing information. According to one aspect, the computer system 700 can be a cloud computing server of an IaaS that is able to support PaaS and SaaS services. According to one aspect, the computer system 700 is implemented as one or more special-purpose computing devices. The special-purpose computing device may be hard-wired to perform the disclosed techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques. By way of example, the computer system 700 may be implemented with one or more processors 702. Processor 702 may be a general-purpose microprocessor, a microcontroller, a Digital Signal Processor (DSP), an ASIC, a FPGA, a Programmable Logic Device (PLD), a controller, a state machine, gated logic, discrete hardware components, or any other suitable entity that can perform calculations or other manipulations of information.

Computer system 700 can include, in addition to hardware, code that creates an execution environment for the computer program in question, e.g., code that constitutes processor firmware, a protocol stack, a database management system, an operating system, or a combination of one or more of them stored in an included memory (e.g., memory 704), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 708 for storing information and instructions to be executed by processor 702. The processor 702 and the memory 704 can be supplemented by, or incorporated in, special purpose logic circuitry. Expansion memory may also be provided and connected to computer system 700 through input/output module 710, which may include, for example, a SIMM (Single In-Line Memory Module) card interface. Such expansion memory may provide extra storage space for computer system 700, or may also store applications or other information for computer system 700. Specifically, expansion memory may include instructions to carry out or supplement the processes described above, and may include secure information also. Thus, for example, expansion memory may be provided as a security module for computer system 700, and may be programmed with instructions that permit secure use of computer system 700. In addition, secure applications may be provided via the SIMM cards, along with additional information, such as placing identifying information on the SIMM card in a non-hackable manner.

The instructions may be stored in the memory 704 and implemented in one or more computer program products, e.g., one or more modules of computer program instructions encoded on a computer readable medium for execution by, or to control the operation of, the computer system 700 and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PUP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multi-paradigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 704 may also be used for storing temporary variable or other intermediate information during execution of instructions to be executed by processor 702.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network, such as in a cloud-computing environment. The processes and logic flows described in this specification can be performed by one or more programmable processors executing one or more computer programs to perform functions by operating on input data and generating output.

Computer system 700 further includes a data storage device 706 such as a magnetic disk or optical disk, coupled to bus 708 for storing information and instructions. Computer system 700 may be coupled via input/output module 710 to various devices (e.g., device 714 or device 716. The input/output module 710 can be any input/output module. Example input/output modules 710 include data ports such as USB ports. In addition, input/output module 710 may be provided in communication with processor 702, so as to enable near area communication of computer system 700 with other devices. The input/output module 702 may provide, for example, for wired communication in some implementations, or for wireless communication in other implementations, and multiple interfaces may also be used. The input/output module 710 is configured to connect to a communications module 712. Example communications modules (e.g., communications module 712 include networking interface cards, such as Ethernet cards and modems).

The components of the system can be interconnected by any form or medium of digital data communication, e.g., a communication network. The communication network (e.g., communication network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

For example, in certain aspects, communications module 712 can provide a two-way data communication coupling to a network link that is connected to a local network. Wireless links and wireless communication may also be implemented. Wireless communication may be provided under various modes or protocols, such as GSM (Global System for Mobile Communications), Short Message Service (SMS), Enhanced Messaging Service (EMS), or Multimedia Messaging Service (MMS), CDMA (Code Division Multiple Access), Time division multiple access (TDMA), Personal Digital Cellular (PDC), Wideband CDMA, General Packet Radio Service (GPRS), or LTE (Long-Term Evolution), among others. Such communication may occur, for example, through a radio-frequency transceiver. In addition, short-range communication may occur, such as using a BLUETOOTH, WI-FI, or other such transceiver.

In any such implementation, communications module 712 sends and receives electrical, electromagnetic or optical signals that carry digital data streams representing various types of information. The network link typically provides data communication through one or more networks to other data devices. For example, the network link of the communications module 712 may provide a connection through local network to a host computer or to data equipment operated by an Internet Service Provider (ISP). The ISP in turn provides data communication services through the world wide packet data communication network now commonly referred to as the "Internet". The local network and Internet both use electrical, electromagnetic or optical signals that carry digital data streams. The signals through the various networks and the signals on the network link and through communications module 712, which carry the digital data to and from computer system 700, are example forms of transmission media.

Computer system 700 can send messages and receive data, including program code, through the network(s), the network link and communications module 712. In the Internet example, a server might transmit a requested code for an application program through Internet, the ISP, the local network and communications module 712. The received code may be executed by processor 750 as it is received, and/or stored in data storage 706 for later execution.

In certain aspects, the input/output module 710 is configured to connect to a plurality of devices, such as an input device 714 (e.g., input device 316 and/or an output device 716 (e.g., output device 314. Example input devices 714 include a keyboard and a pointing device, e.g., a mouse or a trackball, by which a user can provide input to the computer system 700. Other kinds of input devices 714 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 716 include display devices, such as a LED (light emitting diode), CRT (cathode ray tube), LCD (liquid crystal display) screen, a TFT LCD (Thin-Film-Transistor Liquid Crystal Display) or an OLED (Organic Light Emitting Diode) display, for displaying information to the user. The output device 716 may comprise appropriate circuitry for driving the output device 716 to present graphical and other information to a user.

According to one aspect of the present disclosure, the client 110 and server 130 can be implemented using a computer system 700 in response to processor 702 executing one or more sequences of one or more instructions contained in memory 704. Such instructions may be read into memory 704 from another machine-readable medium, such as data storage device 706. Execution of the sequences of instructions contained in main memory 704 causes processor 702 to perform the process steps described herein. One or more processors in a multi-processing arrangement may also be employed to execute the sequences of instructions contained in memory 704. Processor 702 may process the executable instructions and/or data structures by remotely accessing the computer program product, for example by downloading the executable instructions and/or data structures from a remote server through communications module 712 (e.g., as in a cloud-computing environment). In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. For example, some aspects of the subject matter described in this specification may be performed on a cloud-computing environment. Accordingly, in certain aspects a user of systems and methods as disclosed herein may perform at least some of the steps by accessing a cloud server through a network connection. Further, data files, circuit diagrams, performance specifications and the like resulting from the disclosure may be stored in a database server in the cloud-computing environment, or may be downloaded to a private storage device from the cloud-computing environment.

Computing system 700 can include clients and servers. A client and server are generally remote from each other and typically interact through a communication network. The relationship of client and server arises by virtue of computer programs running on the respective computers and having a client-server relationship to each other. Computer system 700 can be, for example, and without limitation, a desktop computer, laptop computer, or tablet computer. Computer system 700 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer-readable medium" as used herein refers to any medium or media that participates in providing instructions or data to processor 702 for execution. The term "storage medium" as used herein refers to any non-transitory media that store data and/or instructions that cause a machine to operate in a specific fashion. Such a medium may take many forms, including, but not limited to, non-volatile media, volatile media, and transmission media. Non-volatile media include, for example, optical disks, magnetic disks, or flash memory, such as data storage device 706. Volatile media include dynamic memory, such as memory 704. Transmission media include coaxial cables, copper wire, and fiber optics, including the wires that comprise bus 708. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire and fiber optics, including the wires that comprise bus 708. Transmission media can also take the form of acoustic or light waves, such as those generated during radio-wave and infra-red data communications. Furthermore, as used in this specification of this application, the terms "computer", "server", "processor", and "memory" all refer to electronic or other technological devices. These terms exclude people or groups of people. For the purposes of the specification, the terms display or displaying means displaying on an electronic device.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for".

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted that the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method for mapping communication content based on topic analysis to determine user knowledge scores, the method comprising:
    receiving a plurality of communication content, wherein the plurality of communication content comprises a non-spoken content;
    converting, as converted content, a spoken content to an additional non-spoken content;
    generating from the communication content, a data set, wherein the data set comprises a plurality of words contained within the converted content and the non-spoken content;
    constructing, from the data set, a generative statistical model that identifies a list of topics from the data set and identifies a topic percentage determined from a probability that a word in the data set is associated with a given topic in the list of topics;
    generating a communication content graph comprising user nodes and word edges for each identified topic in the list of topics;
    calculating a topic strength for each word edge between two different users, wherein the topic strength is calculated by multiplying the topic percentage by a number of words in the communication content, and is indicative of a likelihood that the communication content shared between the two different users is associated with a particular topic;
    determining, based on the topic strengths, a user knowledge score for each user associated with each identified topic, wherein the user knowledge score is determined by adding the topic strength associated with each topic for all adjacent edges in the communication content graph;
    outputting the user knowledge score; and
    determining that the user is an expert on the topic based on the user knowledge score.

2. The computer-implemented method of claim 1, further comprising:
    reviewing the output of the generative statistical model and manually identifying the list of topics.

3. The computer-implemented method of claim 1, wherein the plurality of communication content comprises one or more of: call recordings, instant messages, text messages, audio meeting recordings, emails, calendar appointments and video meeting recordings.

4. The computer-implemented method of claim 1, wherein constructing the generative statistical model is performed using a Latent Dirichlet allocation method, an unsupervised topic modeling method, or a generative probabilistic topic modeling method.

5. The computer-implemented method of claim 1, wherein generating the communication content graph further comprises normalizing the communication content of the data set.

6. The computer-implemented method of claim 1, wherein the topic strength is further calculated by further multiplying by a communication content weight.

7. The computer-implemented method of claim 6, wherein the communication content weight is determined as a function of an age of the communication content or a type of communication content.

8. The computer-implemented method of claim 6, wherein the communication content weight is provided by the user.

9. The computer-implemented method of claim 1, wherein the user knowledge score is output for use in a topic search user interface.

10. The computer-implemented method of claim 1, wherein the user knowledge score is output for use in a topic browsing user interface.

11. The computer-implemented method of claim 1, wherein the user knowledge score is determined by summing the topic strength associated with each topic for all edges in the communication content graph.

12. A system for mapping communication content based on topic analysis to determine user knowledge scores, the system comprising:
- a memory comprising instructions; and
- one or more processors configured to execute instructions, which, when executed, cause the one or more processors to:
- receive a plurality of communication content, wherein the plurality of communication content comprises a non-spoken content;
- convert, as converted content, a spoken content to an additional non-spoken content;
- generate, from the communication content, a data set, wherein the data set comprises a plurality of words contained within the converted content and the non-spoken content;
- construct, from the data set, a generative statistical model that identifies a list of topics from the data set and identifies a topic percentage determined from a probability that a word in the data set is associated with a given topic in the list of topics;
- generate a communication content graph comprising user nodes and word edges for each identified topic in the list of topics;
- calculate a topic strength for each word edge between two different users, wherein the topic strength is calculated by multiplying the topic percentage by a number of words in the communication content, and is indicative of a likelihood that the communication content shared between the two different users is associated with a particular topic;
- determine, based on the topic strengths, a user knowledge score for each user associated with each identified topic, wherein the user knowledge score is determined by adding the topic strength associated with each topic for all adjacent edges in the communication content graph;
- output the user knowledge score for use or display in a topic search user interface or a topic browsing user interface; and
- determine that the user is an expert on the topic based on the user knowledge score.

13. The system of claim 12, wherein the one or more processors are further configured to:
- display the output of the generative statistical model to the user and receive user input to identify the list of topics.

14. The system of claim 12, wherein the plurality of communication content comprises one or more of: call recordings, instant messages, text messages, audio meeting recordings, emails, calendar appointments and video meeting recordings.

15. The system of claim 12, wherein the generative statistical model comprises a Latent Dirichlet allocation model, an unsupervised topic model or a generative probabilistic topic model.

16. The system of claim 12, wherein the one or more processors are further configured to normalize the communication content of the data set to generate the communication content graph.

17. The system of claim 12, wherein the topic strength is calculated by further multiplying by a communication content weight.

18. The system of claim 17, wherein the communication content weight is determined as a function of an age of the communication content or a type of communication content.

19. The system of claim 12, wherein the user knowledge score is determined by summing the topic strength associated with each topic for all edges in the communication content graph.

20. A machine readable storage medium containing program instructions for causing a computer to map communication content based on topic analysis to determine user knowledge scores performed by a method of:
- receiving a plurality of communication content, wherein the plurality of communication content comprises a non-spoken content generated by employees of an organization;
- converting, as converted content, a spoken content to an additional non-spoken content;
- generating, from the communication content, a data set, wherein the data set comprises a plurality of words contained within the converted content and the non-spoken content;
- constructing, from the data set using a Latent Dirichlet allocation method, a generative statistical model that identifies a list of topics from the data set and identifies a topic percentage determined from a probability that a word in the data set is associated with a given topic in the list of topics;
- normalizing the communication content of the data set in the generative statistical model;
- generating, based on the communication content, a communication content graph comprising employee nodes and word edges for each identified topic in the list of topics;
- calculating a topic strength for each word edge between two different users by multiplying the topic percentage by a number of words in the communication content, which is indicative of a likelihood that the communication content shared between the two different users is associated with a particular topic;
- determining, based on the topic strengths, an employee knowledge score for each employee associated with each identified topic, wherein the employee knowledge score is determined by summing the topic strengths associated with each topic for all adjacent edges in the communication content graph;
- outputting the employee knowledge score to a database; and
- determining that the employee is an expert on the topic based on the user knowledge score.

* * * * *